May 29, 1945.  E. K. ALLEN  2,376,953
LOG CARRIER
Filed July 17, 1944  2 Sheets-Sheet 1
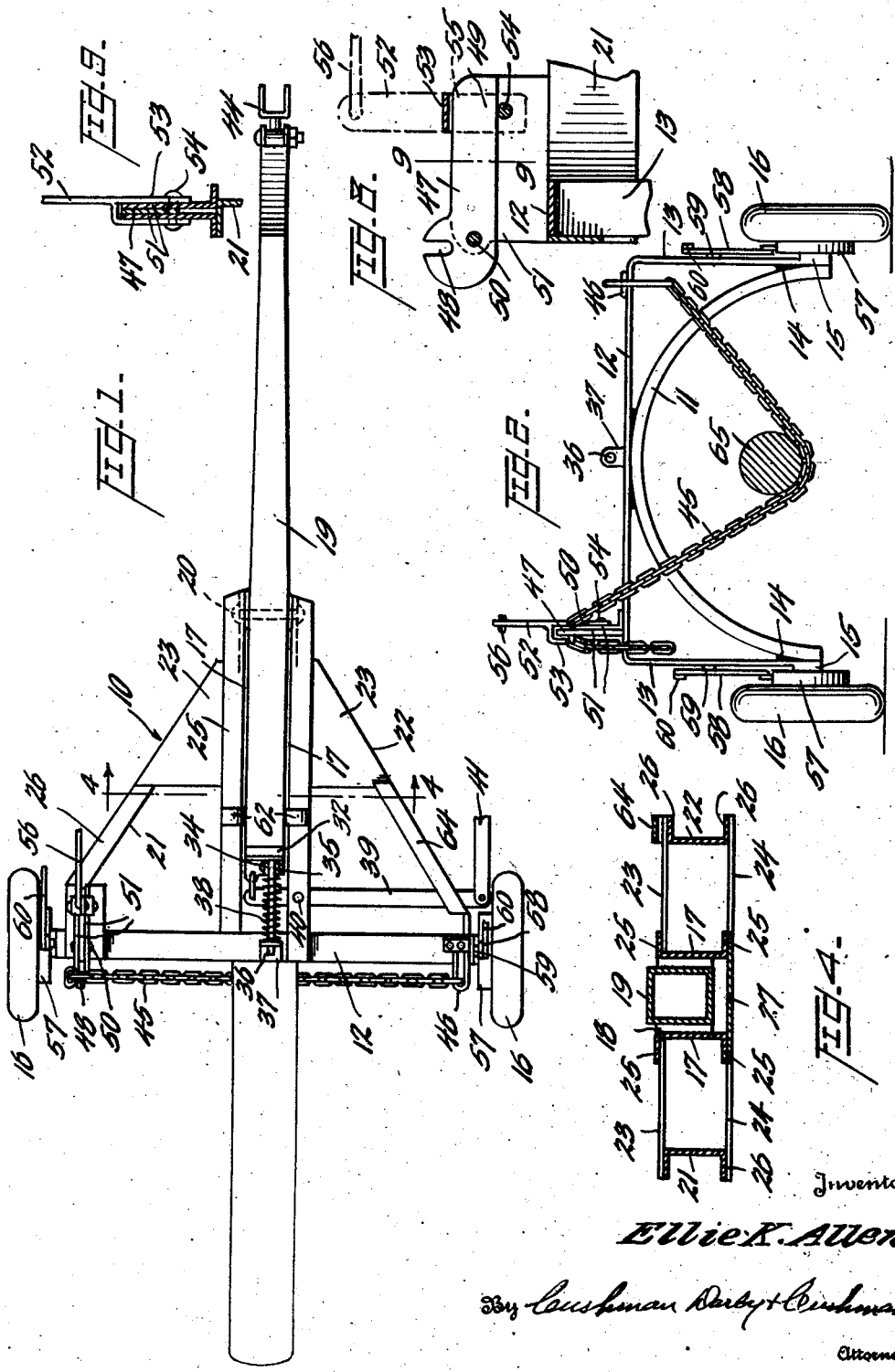
Inventor
Ellie K. Allen,
By Cushman Darby & Cushman
Attorney

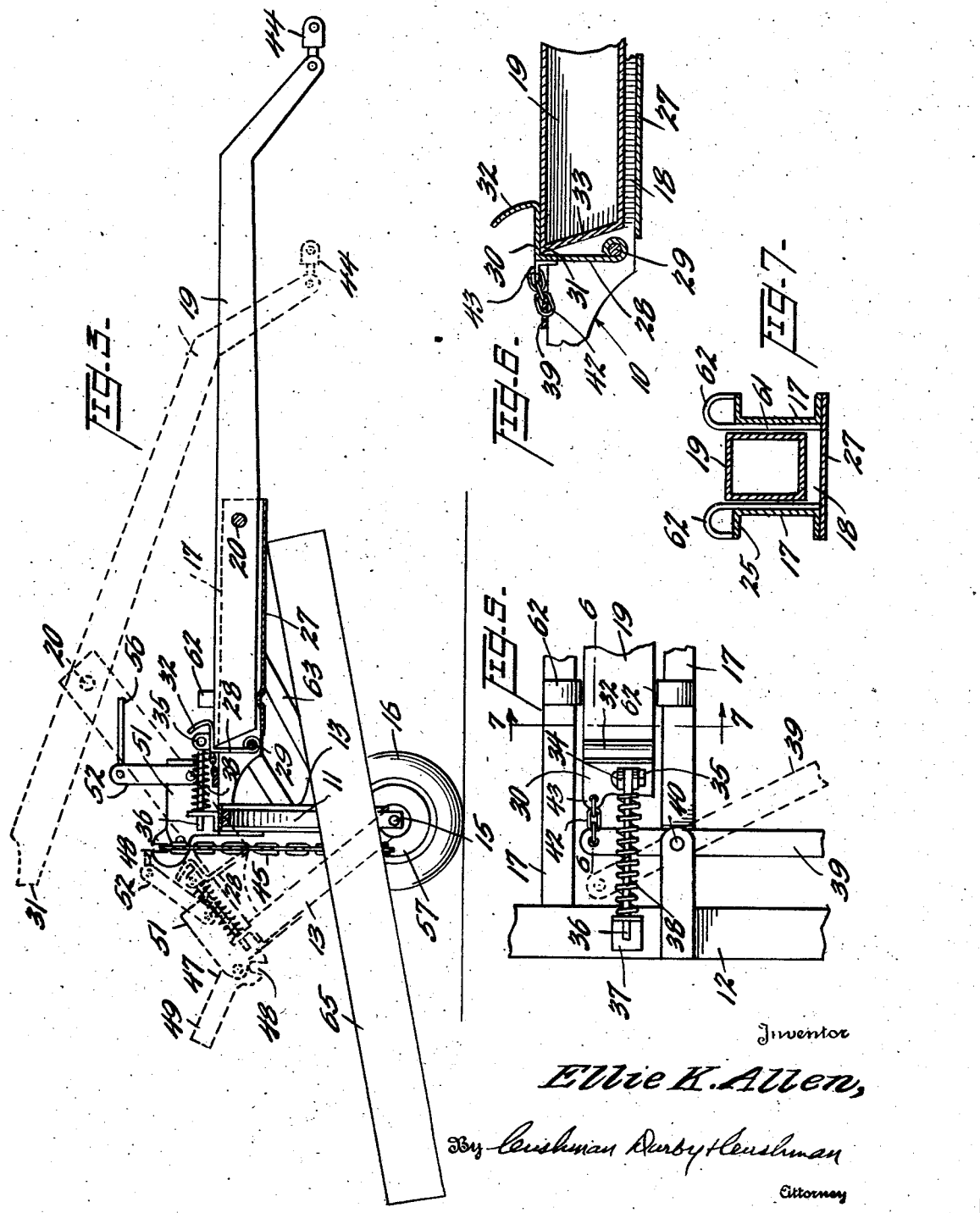

Patented May 29, 1945

2,376,953

UNITED STATES PATENT OFFICE 2,376,953

LOG CARRIER

Ellie K. Allen, Creedmoor, N. C.

Application July 17, 1944, Serial No. 545,364

7 Claims. (Cl. 214—65.3)

The present invention relates to a vehicle for transporting articles and more particularly to an improved log carrier.

An important object of the invention is to provide a log carrier or cart having a pivotally connected tongue, with locking means for releasably securing the rear end of the tongue to the carrier so that the latter may be tilted rearwardly to facilitate the loading of the logs, and which raises the logs to support them by the carrier, and also locks the tongue to the carrier as the tongue is moved forwardly to bring the rear end thereof into engagement with the locking means.

A further object consists in providing a chain or flexible member for suspending the logs from the carrier, and associating with the carrier a member for receiving an end portion of the chain to maintain the same in any desired adjusted position. This member is pivoted to the carrier and is normally held in a fixed position by retaining means which when released allows the member to swing about its pivot so as to discharge the logs.

Another object comprehends the provision of means associated with a log hauling device or similar vehicle, for facilitating the loading and unloading of the logs and which requires the services of only one man to operate.

Other objects and advantages of the invention will become apparent from the following description when taken in conjunction with the accompanying claims and drawings.

Referring to the drawings in which is shown a preferred embodiment of the invention;

Figure 1 is a plain view of my improved log carrier,

Figure 2 is a rear end view of Figure 1,

Figure 3 is a longitudinal sectional view of the carrier,

Figure 4 is a sectional view taken substantially along the line 4—4 of Figure 1, Figure 5 is a detailed plan view showing the rear end of the tongue connected to the carrier by the locking means, Figure 6 is a sectional view taken substantially along the line 6—6 of Figure 5, Figure 7 is a sectional view taken substantially along the line 7—7 of Figure 5, Figure 8 is a detailed side elevation of the means for releasably connecting the chain to the carrier, and Figure 9 is a sectional view taken substantially along the line 9—9 of Figure 8.

Referring to the drawings, 10 designates a supporting frame or carriage preferably made of light durable metal and having at its rear end a transversely disposed curved bar or axle 11 (Figure 2) with which is associated an inverted U-shaped member 12 having depending side arms 13 secured by welding or the like as at 14 to the ends of the bar 11. Stub axles 15 extend outwardly from the lower sides of the arms 13 and have journalled thereon the traction wheels 16. Spaced angle shaped bars 17 extend outwardly from the bar 11 to provide a longitudinally and centrally disposed recess or socket 18 (Figure 4) for receiving the rear end portion of the tongue or draft pole 19 which is pivotally connected to the sides of the bars 17 by the bolt 20. Side bars 21 and 22 of angle shape in cross section are welded or otherwise connected at their rear ends to the depending arms 13 and converge outwardly so as to be welded to the bars 17 adjacent the forward end thereof. Spaced upper plates or webs 23 and lower plates 24 are welded to the flanges 25 and 26 of the bars 17, 21 and 22, to provide additional reinforcements for the frame at the forward end thereto. The bottom of the longitudinal recess 18 may be closed by a plate 27 welded to the flanges 25 of the bars 17. The longitudinal bars 17 and the side bars 21 and 22 are connected together to form hounds for the tongue 19.

The rear end of the recess 18 is spaced from the cross bar 12 and has mounted therein a yieldable locking means for engagement with the rear end portion of the tongue 19 to maintain the same in a fixed position. This locking means preferably comprises a metal member 28 extending transversely of the recess 18 and pivoted at its lower end to the sides of the bars 17 by the bolt 29 (Figure 6). The upper end of the member 28 has a forwardly extending portion 30 that constitutes a shoulder for receiving the adjacent rear end 31 of the tongue 19. The portion 30 terminates in an upwardly and rearwardly curved, yieldable lip or flange 32 which is positioned in the path of movement of the tongue so as to be actuated thereby. The rear end of the tongue is preferably formed with an inclined surface 33 which coacts with the lip 32 to force the member 28 rearwardly about its pivot 29 to facilitate the engagement of the tongue with the shoulder 30. A lug 34 (Figure 5) extends upwardly from the shoulder 30 of the member 28 and has pivotally connected thereto as at 35 a rod 36, the rear end of which extends loosely through a lug 37 on the bar 12. A coil spring 38 encircles the rod 36 and is confined between the lugs 34 and 37 so as normally to urge the member 28 forwardly. An operating lever 39 pivoted as at 40 to one of the bars 17, has its outer end connected to a rod or other suitable actuating means 41. The other end of the lever 39 is connected by a chain 42 to a lug 43 on the member 28 (Figure 6) so that upon the outer end of the lever 39 being moved forwardly, the inner end thereof is swung rearwardly against the tension of the spring 38 in order to release the end of the tongue from engagement with the shoulder 30. The forward end of the tongue 19 may be provided with a coupling clevis 44 for connecting the log carrier to a towing vehicle such as a tractor or the like, not shown.

A flexible member such as the chain 45 (Figure 2) is connected at one end to a supporting member or link 46 carried by the bar 12 adjacent one side thereof. The opposite end of the chain 45 is arranged to be detachably connected to the frame by a releasable retaining means, which preferably comprises a member 47 having its rear end portion formed with a hook or recess 48 for receiving a link of the chain 45 so as adjustably to secure the same thereto. The member 47 has a normally extending horizontal arm 49 and is pivoted at 50 between the spaced bracket arms 51 mounted on the frame adjacent the side thereof opposite to the member 46. The arm 49 of the member 47 normally fits between the brackets 51 and is retained in a horizontal position by a lever 52 having a bifurcated lower end portion 53, the arms of which are disposed outside of the brackets 51 and are pivoted at their lower ends thereto as at 54, thus providing a loop 55 (Figure 8) arranged to overlap the lugs and the arm 49 of the member 50 so as to retain the latter in a fixed position. The lever 52 is connected to an actuating rod 56 so that when it is moved away from the brackets 51, it will allow the member 47 to swing about its pivot. Preferably, each of the wheels 16 has associated therewith any suitable form of brake mechanism indicated generally as at 57 and connected by the lever 58 pivoted at 59 to the adjacent side arm 13. These brakes are primarily used to stop the rearward movement of the carrier so that the frame may be tilted to its loading position. A rod 60 extends forwardly from the lever 59 and this rod, together with the rods 41 and 56, are preferably connected to suitable mechanism positioned adjacent the driver's seat of the tractor so that they may be selectively actuated. A pair of bars or arms 61 are positioned in the recess 18 adjacent the rear end thereof and have outwardly and downwardly curved portions 62 (Figure 7) extending upwardly from the frame to provide combined guide and cushioning means for maintaining the adjacent end portion of the tongue 19 firmly within the recess 18 when the member 28 is locked thereto. Inclined struts or bars 63 are connected to the arms 13 and the sides 21 and 22 of the frame to further brace the same. A longitudinal strap 64 on the bar 22 acts as a stop for limiting the swinging movement of the lever 39.

In operation, assuming the parts are in the position as shown in full lines in Figure 3 and it is desired to haul a log 65 from the forest to the mill or other suitable point of use, the log carrier is moved rearwardly or backed over the log to a point for properly suspending the log by the carrier, and when this point is reached, the operator first applies the brakes 57 by actuating the rod 60 and then immediately releases engagement of the member 28 with the rear end of the tongue by actuating the rod 41 which causes the shoulder portion 30 of the member 28 to be moved out of engagement with the tongue, and as the rearward movement of the carrier is arrested by the brakes, the rear end of the carrier is tilted downwardly so that the parts assume the position as shown in dotted lines in Figure 3. The chain 45 is then passed under the log or logs 65 and the free end thereof is connected to the hook 48 of the member 47 which is now maintained in a fixed position by the retaining means 52. The carrier is then moved forwardly by the tractor or other suitable hauling vehicle, and as this forward movement continues, the rear end of the tongue which is in an elevated position is lowered and snaps into engagement with the shoulder 30. It will be seen that during this movement, the inclined surface 33 on the rear end of the tongue initially engages the yieldable lip 32 so as to force the same rearwardly against the tension of the spring 38 and when the rear portion of the tongue is fully positioned within the recess 18, the shoulder 30 is forced outwardly by the spring 38 to firmly and securely maintain the tongue in a fixed, locked position on the carrier. When the log is hauled to the point where it is to be discharged, the driver or operator actuates the rod 56, thus releasing the lever 52 from engagement with the arm 49 of the member 47 and the weight of the log 63 causes the hook 48 to swing downwardly about its pivot thus releasing one end of the chain and the log therefrom.

It will be seen that by reason of the present construction and arrangement of the log carrier, simple, efficient, economical and positive means are provided for loading and transporting logs and similar shaped articles from one place to another and for releasing and discharging the logs.

The carrier is arranged to haul one or more logs and is capable of sustaining a weight of from 10,000 to 25,000 pounds and requires the use of only one man to connect and release the logs. Usually, the length of the logs are such that the log piler or snaker applies the chain to a log at a predetermined point so that upon the log being suspended by the chain from the carrier and the frame moved from its inclined to its horizontal position, the forward end of the log engages the underside of the frame and the rear end of the log is raised above the ground so that the log or logs are entirely supported by the frame.

It is to be understood that the form of the invention shown and described is merely illustrative of a preferred embodiment and that such changes may be made as fall within the purview of one skilled in the art without departing from the spirit of the claimed invention.

I claim:

1. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end adapted normally to fit in said recess, yieldable locking means on the frame and arranged to engage the rear end of the tongue for releasably maintaining the latter in said recess, a log chain having one end connected to a side of the frame, a member pivotally mounted on the opposite side of the frame, said member having a hook for receiving the other end of the chain and an outwardly extending arm, and movable means for maintaining said arm in a fixed position, the parts being constructed and arranged so that when the rear end of the tongue is released from locking engagement with the frame, the latter may be tilted rearwardly and the log connected by the chain to the frame, and as the tongue moves forwardly, the rear end thereof is snapped into engagement with the locking means and the log is raised to be supported by the frame, and when it is desired to discharge the log, the movable means is moved out of engagement with said arm and the weight of the log acts to release one end of the chain from the frame.

2. A log carrier comprising a supporting frame having depending spaced arms at one end, wheels journaled in said arms, said frame having a forwardly extending hound provided centrally with a longitudinal recess, a tongue pivotally connected to the side walls of said recess and having its rear end portion arranged normally to fit into said recess, yieldable locking means on the frame and extending transversely of said recess to engage and maintain the rear end of the tongue in the recess, means for releasing the locking means from the tongue to allow the rear end of the frame to be tilted downwardly, a log chain connected at one end to the side of the frame, a member pivoted to the opposite side of the frame and having a hook for receiving the other end of the chain, said member having a forwardly extending arm, and retaining means pivoted to the frame and arranged to engage said arm for preventing the hook from moving downwardly, and means for actuating the retaining means to release it from engagement with said arm, the parts being constructed and arranged so that when the tongue is released from the locking means, the frame is tilted rearwardly and the chain passed under the logs and connected to said hook so that upon the tongue being moved forwardly it is snapped into engagement with the locking means and the logs are raised to be supported by the carrier, and when it is desired to discharge the logs the retaining means is moved out of engagement with the arm of said member and the weight of the logs acts to swing the hook portion downwardly to release the chain.

3. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end adapted normally to fit in said recess, yieldable locking means on the frame and arranged to engage the rear end of the tongue for releasably maintaining the latter in said recess, a log chain having one end connected to a side of the frame, a member pivotally mounted on the opposite side of the frame, said member having a hook for receiving the other end of the chain and an outwardly extending arm, and movable means for maintaining said arm in a fixed position, and brake means associated with the wheels for arresting the rearward movement of the carrier, the parts being constructed and arranged so that when the log carrier is moved rearwardly and the brakes are applied and the rear end of the tongue is released from locking engagement with the frame, the frame is tilted rearwardly and the log connected by the chain to the frame, and upon release of the brakes and the tongue being moved forwardly, the rear end of the tongue snaps into engagement with the locking means and the log raised to be supported by the frame, and when it is desired to release the log, the movable means is moved out of engagement with said arm, so that the weight of the log acts to release the end of the chain from said member to discharge the log.

4. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end arranged normally to fit in the recess, releasable means for maintaining the tongue in said recess, said releasable means including a member extending transversely of said recess adjacent the rear end thereof, means pivotally connecting the lower end of said member to the frame, said member having at its upper end a forwardly extending shoulder, said shoulder arranged to engage the top of the rear end of the tongue to lock the latter in a fixed position relative to the frame, spring means connected to the frame and said member for normally urging the latter forwardly, and means for moving said member rearwardly against the pressure of said spring to release the tongue therefrom to allow the latter to swing about its pivot.

5. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end arranged normally to fit in the recess, releasable means for maintaining the tongue in said recess, said releasable means including a member extending transversely of said recess adjacent the rear end thereof, means pivotally connecting the lower end of said member to the frame, said member having at its upper end a forwardly extending shoulder, said shoulder arranged to engage the top of the rear end of the tongue to lock the latter in a fixed position relative to the frame, spring means connected to the frame and said member for normally urging the latter forwardly, means for moving said member rearwardly against the pressure of said spring to release the tongue therefrom to allow the latter to swing about its pivot, and brake means associated with the wheels for arresting the rearward movement of the carrier.

6. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end arranged normally to fit in the recess, releasable means for maintaining the tongue in said recess, said releasable means including a yieldable member extending transversely of said recess adjacent the rear end thereof, means pivotally connecting the lower end of said member to the frame, said member having at its upper end a forwardly extending shoulder terminating in a rearwardly bent lip portion, said shoulder arranged to engage the top of the rear end of the tongue to lock the latter in a fixed position relative to the frame, said tongue having its rear end inclined to engage and coact with said lip portion for facilitating engagement of the tongue with said shoulder, and spring means connected to the frame and said member for normally urging the latter forwardly.

7. A log carrier comprising a supporting frame having depending spaced arms at one end, wheels journaled in said arms, said frame having a forwardly extending portion provided centrally with a longitudinal recess, a tongue pivotally connected to the side walls of said recess and having its rear end arranged normally to fit in the recess, releasable means for maintaining the tongue in said recess, a log chain connected at one end to the side of the frame, a member pivoted to the opposite side of the frame and having a hook portion for receiving the other end of the chain, said member having a forwardly extending arm, and retaining means pivoted to the frame and arranged to engage said arm from preventing the hook from moving downwardly, and means for actuating the retaining means to release the same from engagement with said arm, the parts being constructed and arranged so that when the logs are carried by the frame and the retaining means is moved out of engagement with said arm, the weight of the logs acts to swing the hook downwardly to release the log.

ELLIE K. ALLEN.